(12) United States Patent
Frederick et al.

(10) Patent No.: US 6,314,479 B1
(45) Date of Patent: Nov. 6, 2001

(54) UNIVERSAL MULTI-PIN PLUG AND DISPLAY CONNECTOR FOR STANDARDIZING SIGNALS TRANSMITTED BETWEEN A COMPUTER AND A DISPLAY FOR A PC THEATRE INTERCONNECTIVITY SYSTEM

(75) Inventors: John W. Frederick; Montgomery C. McGraw, both of Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/124,473

(22) Filed: Jul. 29, 1998

Related U.S. Application Data

(60) Provisional application No. 60/054,616, filed on Aug. 4, 1997.

(51) Int. Cl.[7] .............................. G06F 13/10; G06F 13/14
(52) U.S. Cl. ............................... 710/63; 710/69; 710/70; 709/208; 709/250
(58) Field of Search .................... 710/63, 69, 70; 713/300; 709/208, 249, 250

(56) References Cited

U.S. PATENT DOCUMENTS

| 5,699,263 | * | 12/1997 | Nakao | 364/481 |
|---|---|---|---|---|
| 5,790,201 | * | 8/1998 | Antos | 348/552 |
| 5,850,340 | * | 12/1998 | York | 364/188 |
| 5,862,219 | * | 1/1999 | Glaab | 380/20 |
| 5,880,721 | * | 3/1999 | Yen | 345/327 |
| 5,903,259 | * | 5/1999 | Brusky et al. | 345/168 |
| 5,936,675 | * | 8/1999 | Zhang et al. | 348/466 |
| 5,936,678 | * | 8/1999 | Hirashima | 348/573 |
| 5,982,363 | * | 11/1999 | Naiff | 345/327 |
| 6,072,541 | * | 6/2000 | Song | 348/706 |

* cited by examiner

Primary Examiner—Thomas Lee
Assistant Examiner—Thuan Du
(74) Attorney, Agent, or Firm—Sharp, Comfort & Merrett, P.C.

(57) ABSTRACT

An interconnectivity scheme for a PC Theatre system includes the use of compatible plug and display connectors on both the display and the host computer. Audio/video signals received by either the display or the computer may be processed by the computer and transmitted between these devices in a standardized signal format using the compatible connectors. The control scheme for facilitating master-slave control of the display by the computer includes the use of various standardized signals and formats as well to ensure compatibility between products manufactured by different companies.

14 Claims, 5 Drawing Sheets

UNIVERSAL MULTI-PIN PLUG AND DISPLAY CONNECTOR FOR STANDARDIZING SIGNALS TRANSMITTED BETWEEN A COMPUTER AND A DISPLAY FOR A PC THEATRE INTERCONNECTIVITY SYSTEM

CROSS-REFERENCE TO RELATED APPLICATIONS

This non-provisional application is related to provisional application serial no. 60/054,616, filed on Aug. 4, 1997, the entirety of which is hereby incorporated by reference.

BACKGROUND OF THE INVENTION

1. Field Of The Invention

The present invention relates generally to devices with multiple functional modalities and, in particular, to the interconnectivity of various elements of such devices.

2. Description Of The Related Art

With the advent of multi-media devices, the integration of information, entertainment, and communications technologies has become a much sought-after goal. A highly visible example of this trend is the attempt to integrate computer technologies, such as personal computers for example, with consumer/home electronics technologies, such as televisions (TV), video games, telephones, and video/laser discs for example. One of the likely products of this convergence may be a single integrated device capable of providing information, entertainment, and communications functions. Such a device may, at least in part, utilize the available communications bandwidth, mass storage, and graphics handling capabilities of the personal computer (PC) in a variety of applications to provide a highly versatile product to consumers.

In spite of many recent advances in the area of multi-media, several problems persist. One of the more significant difficulties relates to interconnecting a computer with one or more consumer/home electronic devices. In an integrated device of this kind, the interconnection between these various functional elements of the multi-media device should permit a user to control the modes of "functionalities" in a manner that facilitates a seamless transition from one functionality to another. While such controlled interconnectivity may be relatively simple to realize in a multi-media device designed and manufactured by a single manufacturer, it would undoubtedly become an exceedingly complex, if not impossible, task to provide such interconnectivity among different functional elements provided by different manufacturers.

Of the new generation of multi-media products, the one of most interest will likely be the convergence of the TV and PC to create a new category of entertainment products. These products will give the consumer more entertainment options by combining the features of a PC and TV in a truly converged environment that is as easy to use as a standard TV. The computing power of a properly adapted computer, called a PC Theatre system, coupled with a large-screen display make this an excellent living room platform for digital and interactive services that are available now, and new services that will be available in the future.

As this new product category grows, consumer electronics (CE) companies are likely to include monitor functionality in their TVs. At the same time, PC manufacturers are likely to add TV functionality to their computers. This increased functionality in both the TV and PC greatly increases the value to the consumer.

However, as alluded to above, since there are no standards for this new product category, products from different manufacturers will be incompatible. Standard interconnectivity should facilitate consumer confidence in this new product, as well as growth of this new product category. Such standard interconnectivity will allow companies from both industries to develop compatible PC Theatre products so that the consumer will be able to select a display and a PC from different manufacturers and use them together as a system without the need for custom cables and complicated setup procedures. In addition, the PC Theatre standards should be compatible with existing standards so PC Theatre displays and computers may be used with standard products.

The present invention may address one or more of the problems discussed above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided an interconnection between a display and a computer. The interconnection includes an audio/video input adapted to receive audio signals and video signals. An audio/video signal processor is coupled to the audio/video input for processing the audio signals and the video signals. An analog/digital plug and display connector is coupled to the audio/video signal processor and is adapted to be coupled to the display. The analog/digital plug and display connector is adapted to transmit the audio signals and the video signals to the display. A universal serial bus hub is coupled to the analog/digital plug and display connector. A universal serial bus port is coupled to the universal serial bus hub.

In accordance with another aspect of the present invention, there is provided an interconnection between a display and a computer. The inter connection includes an audio/video input adapted to receive audio signals and video signals. An audio/video signal processor is coupled to the audio/video input for processing the audio signals and the video signals. An analog or digital plug and display connector is coupled to the audio/video signal processor and is adapted to be coupled to the computer. The analog or digital plug and display connector is adapted to transmit the audio signals and the video signals to the computer. A universal serial bus hub is coupled to the analog or digital plug and display connector. A universal serial bus port is coupled to the universal serial bus hub.

In accordance with still another aspect of the present invention, there is provided a PC Theatre system that includes a video display having a first plug and display connector coupled thereto. A computer has a second plug and display connector coupled thereto. The first plug and display connector is connectable to the second plug and display connector. At least one of the video display and the computer includes an audio/video input adapted to receive audio signals and video signals. At least one of the video display and the computer includes an audio/video signal processor coupled to the audio/video input for processing the audio signals and the video signals. The audio signals and the video signals are transmitted between the video display and the computer via the respective plug and display connectors.

In accordance with yet another aspect of the present invention, there is provided, in a PC Theatre system that includes a video display and a computer, where at least one of the video display and the computer includes an audio/video input adapted to receive audio signals and video signals, and where at least one of the video display and the computer includes an audio/video signal processor coupled to the audio/video input for processing the audio signals and the video signals, an improvement that includes a first plug and display connector coupled to the video display and a second plug and display connector coupled to the computer. The first plug and display connector is connectable to the second plug and display connector to transmit the audio signals and the video signals between the video display and the computer.

In accordance with a further aspect of the present invention, there is provided an interconnection between a display and a computer. The interconnection includes an audio/video input device adapted to receive audio signals and video signals from the computer. An audio/video signal processor is coupled to the audio/video input device for processing the audio signals and the video signals. An enhanced video connector is coupled to the audio/video signal processor and is adapted to be coupled to the display. The enhanced video connector is adapted to transmit the audio signals and the video signals to the display. A universal serial bus hub is coupled to the enhanced video connector. A universal serial bus port is coupled to the universal serial bus hub.

BRIEF DESCRIPTION OF THE DRAWINGS

The foregoing and other advantages of the invention will become apparent upon reading the following detailed description and upon reference to the drawings in which.

DOCUMENTS REFERRED TO IN THE SPECIFICATION

Figure 1:
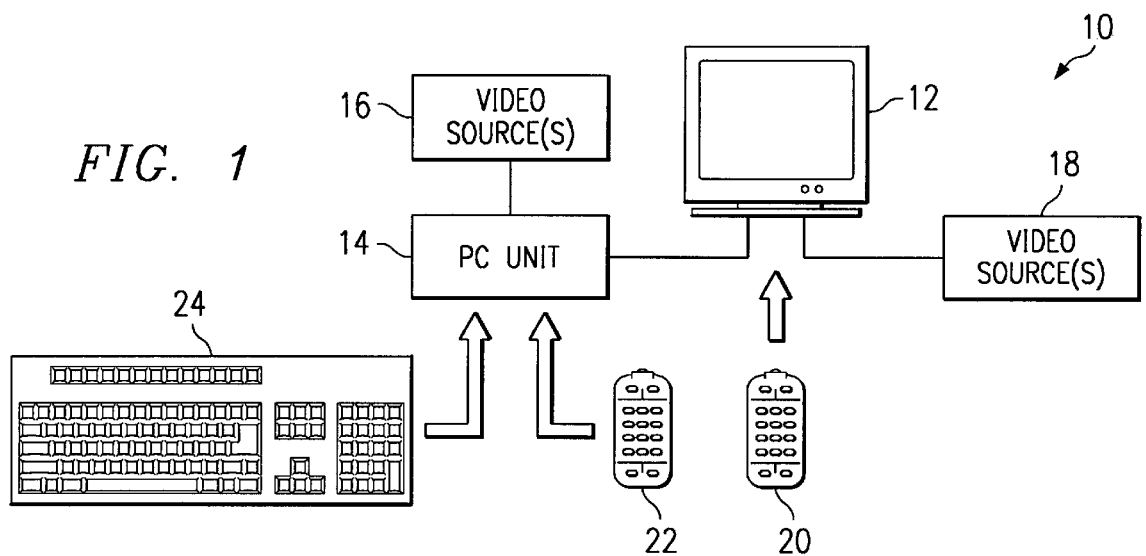
FIG. 1 illustrates a high level block diagram of an exemplary PC Theatre system.

This specification refers to the following documents:

VESA Display Data Channel (DDC) Standard, Version 3.0, Sep. 15, 1997;

VESA Extended Display Identification (EDID) Standard, Version 3.0, Nov. 13, 1997;

VESA Monitor Control Command Set (MCCS) Standard, V 1.0;

VESA Display Power Management Signaling (DPMS) Standard Version 1.1, Aug. 20, 1993;

VESA Plug and Display (P&D) Standard, Version 1.0, Jun. 11, 1997;

VESA Display Monitor Timing Specifications (DMTS), Version 1.7, Dec. 18, 1996;

Universal Serial Bus Specification, Version 1.0, Jan. 15, 1996;

USB Class Definition for Human Interface Devices (HID) Specification, Version 1.0, Dec. 12, 1996;

Universal Serial Bus (USB) Monitor Control Class Specification, Version 1.0, Jan. 5, 1998;

Universal Serial Bus Device Class Definition for Audio Devices, Version 1.0, Mar. 18, 1998;

Universal Serial Bus Device Class Definition for Audio Data Formats, Version 1.0, Mar. 18, 1998;

Universal Serial Bus HID Usage Tables, Version 1.0, Oct. 30, 1997; and

IEEE Standard for a High Performance Serial Bus, 1394-1995.

DETAILED DESCRIPTION OF SPECIFIC EMBODIMENTS

Before discussing the drawings specifically, it should be recognized that as the PC and TV converge, a new product category will be created. The VESA PC Theatre Interconnectivity architecture described herein allows both Personal Computer and Consumer Electronics companies to develop products that are compatible, self configuring, work together as a single system, and are easy to use. The primary focus of this specification is the interface between the PC (and simple computing device such as a set-top box) and the large-screen display.

This specification discusses a PC Theatre Interconnectivity (PCTI) architecture that allows PC and CE manufacturers to produce PC Theatre computer and display products that are compatible and support automatic configuration. The PCTI architecture has been created using existing VESA and USB standards as building blocks to support identification of the display by the PC, bi-directional communication, display control by the PC, sharing of the display's resources by the PC, and transportation of audio and video between the display and PC.

When the display is in stand-alone mode, product features such as channel mapping and government mandated features such as Closed Caption Decoding and V-Chip will be implemented and controlled by the display's internal controller. When the display is in slave-mode and the PC has complete control of the tuner and stores the channel map, the host computing device and application software will be responsible for the channel mapping, Closed Caption Decoding, and V-Chip requirements.

PC Theatre is a consumer entertainment system that merges computing and traditional forms of media and entertainment content. This system combines the features of a TV and a multimedia PC, delivering more entertainment options in a truly converged environment. The consumer may watch TV, use the PC, or do both at the same time.

Turning now to the drawings, and referring initially to FIG. 1, a PC Theatre system is illustrated and generally designated by the reference numeral 10. The system 10 includes two main parts—a display 12 and a computing device, such as a personal computer (PC) 14. The system 10 also includes one or more video sources 16 and 18. As illustrated, one set of video sources 16 may be coupled to the PC 14, and another set of video sources 18 may be coupled directly to the display 12. The PCTI standard is primarily concerned with the interface between the PC 14 and display 12.

The display 12 may have the same functionality as a standard VGA monitor with enhancements for displaying TV video. Optionally, the display 12 may also have all the functionality of a stand-alone TV, including the capability to display standard interlaced TV video. A remote control 20 may be included in the system 10 for delivering control signals to an infrared sensor (not shown) on the display 12.

The PC 14 may be a typical multimedia system with USB support and a video subsystem capable of combining PC and TV video from the video sources 16. The PC 14 may also include IEEE 1394-1995 functionality. In addition, a remote control 22 may be included in the system 10 for delivering the control signals to an radio frequency sensor (not shown) or to an infrared sensor (not shown) on the PC 14. Also, the system 10 may include a keyboard 24, that may be coupled to the PC 14 via a standard cable connection or via a standard RF link.

The interconnectivity between the PC Theatre system PC 14 and the display 12 will now be described in greater detail. This interconnectivity is defined using existing VESA and USB standards as building blocks to support identification of the display 12 by the PC 14, bi-directional communication, display control by the PC, sharing of the display's resources by the PC 14, and transport of audio and video between the display 12 and PC 14.

Figure 2:
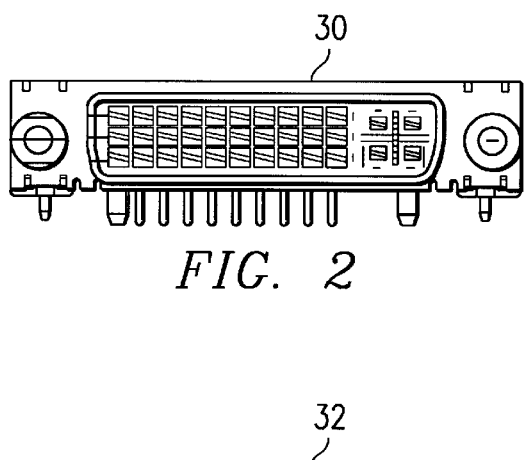
FIG. 2 illustrates an analog/digital (A/D) Plug and Display (P&D) connector.
Figure 3:
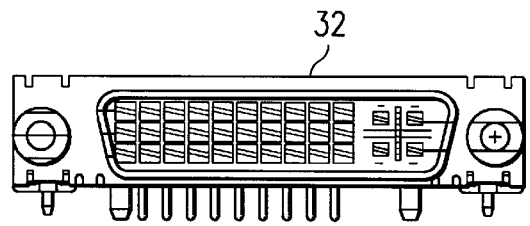
FIG. 3 illustrates an analog P&D connector.
Figure 4:
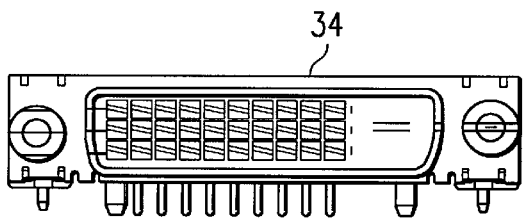
FIG. 4 illustrates a digital P&D connector.

The key points of the PC Theatre interface are as follows:

The PC 14 and display 12 are connected using VESA Plug and Display (P&D) Standard V1.0 connectors, as illustrated in FIGS. 2–4.

The PC 14 drives the display 12 with a standard RGB or TMDS video signal.

The PC 14 and display 12 support two different viewing modes: one configured for the display of PC graphics, and the other configured for the display of TV video.

The PC 14 and display 12 support at least 480 active lines per frame of progressively scanned video.

The PC 14 and display 12 support VESA Display Data Channel (DDC) V3.0 and Extended Display Identification Data (EDID) V3.0 Standards for identification of the display's capabilities.

The PC 14 and display 12 support VESA Display Power Management Signaling (DPMS) Standard V1.1 for PC control of the display's power state.

The PC 14 and display 12 support the USB Monitor Control Class Specification V1.0 and VESA Monitor Control Command Set (MCCS) Standard (proposal) for software control of the display by the PC.

The display 12 and PC 14 use separate analog audio cables to transport stereo audio from the PC 14 to the display 12 and optionally from the display 12 to the PC 14. The PC 14 also supports the USB Device Class Definition for Audio Devices specification V1.0 and USB Device Class Definition for Audio Data Formats specification V1.0 for the support of USB audio.

All user input (remote, keyboard, gamepads, display front button panel) is passed from the display 12 to the PC 14 for processing (when the display is in a slave mode) over USB according to the USB Class Definition for Human Interface Devices (HID) specification V1.0, and the USB HID Usage Tables specification V1.0. The display 12 may also support a stand-alone mode where user input is processed internally.

The VESA P&D Standard V1.0 combines many signals into one connector with support for digital displays (TMDS), analog displays (RGB), IEEE-1394, USB, and DDC. The main advantages of this connector are virtually any type of display can be supported and all required signals for PC Theatre can be supported. Thus, only one cable is used between the PC 14 and display 12. It should also be noted that other connectors, such as those supporting the VESA Enhanced Video Connector Standard, may also be used. In fact, the EVC connector has been redesignated as a P&D-A connector.

The P&D connector supports the following signals:

Standard analog video signals (RGB, H & V sync) for support of analog displays.

Transmission Minimized Digital Signaling (TMDS) video for support of digital displays.

IEEE 1394-1995 pair for support of digital video and audio paths to and from the display.

USB, 12 Mb/s for support of PC control of the display, sending user input from the display to the PC, and audio paths to and from the display.

DDC2B for identification of the display's capabilities.

The PC Theatre PC 14 supports the P&D-A/D (analog/digital) connector 30 illustrated in FIG. 2. The display 12 supports either the P&D-A (analog) connector 32, illustrated in FIG. 3, or the P&D-D (digital) connector 34, illustrated in FIG. 4. The P&D-A/D connector 30 is capable of receiving and transmitting both analog and digital signals, depending upon the type of monitor being used as the display 12. The P&D-A connector 32 is used on analog monitors, and the P&D-D connector 34 is used on digital monitors. It should be noted that the connector 32 shown in FIG. 3 is the P&D-A receptacle and not the plug that is used for the monitor cable. Similarly, it should be noted that the connector 34 shown in FIG. 4 is the P&D-D receptacle and not the plug that is used for the monitor cable. Furthermore, although PC Theatre products should support this P&D standard, if the display 12 or the PC 14 does not use a P&D connector, an adapter cable may be included that combines the supported signals into a P&D connector.

Figure 5:
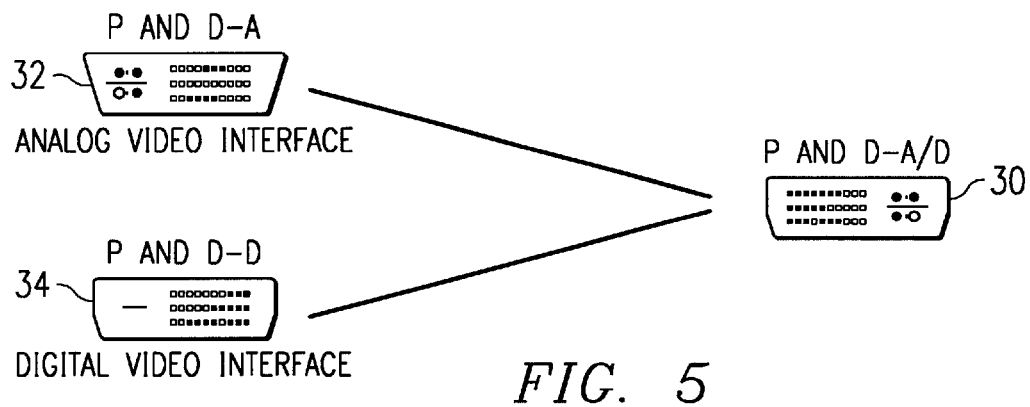
FIG. 5 illustrates a diagrammatic view of interaction between the connectors of FIGS. 2, 3, and 4.

As mentioned above, the P&D-A/D connector 30 on the PC 14 supports both the P&D-A connector 32 and P&D-D connector 34. FIG. 5 explains the interaction between the different connectors in the P&D family, where the blacked-out contacts illustrate the active signal paths in the respective connectors. It should be noted that the connectors 32 and 34 illustrated in FIG. 5 are shown as the plug versions of the respective connector, while the connector 30 is shown as the receptacle version of the connector. As can be clearly seen, either the analog connector 32 or the digital connector 34 may be plugged into the connector 30.

Now that the basic elements of the system 10 have been described, along with the preferred connectors that couple these elements together, attention may now be drawn to the interconnectivity signals used to provide PC Theatre functionality. The PC Theatre PC 14 supports the signal interfaces and connectors listed below in Table 1.

TABLE 1

| PC Signal Interfaces and Connectors | | |
|---|---|---|
| SIGNAL | CONNECTOR | SIGNAL USE |
| RGB (H&V sync) | P&D | Analog video to drive display |
| TMDS | P&D | Digital video to drive display |
| USB | P&D | Control of display, return of user input, and support of USB audio |
| DDC | P&D | For EDID support to identify display |

TABLE 1-continued

PC Signal Interfaces and Connectors

| SIGNAL | CONNECTOR | SIGNAL USE |
| --- | --- | --- |
| Stereo Analog Audio Output | Stereo 3.5 mm jack | Stereo analog audio output for amplifier in display |
| Stereo Analog Audio Input | Stereo 3.5 mm jack | Stereo analog audio input for support of tuner or connector panel in display |
| Composite Input | Composite video connector (yellow) | Composite video source input. A S-video connector may be substituted if an adapter for Composite video support is supplied with the product. |

NOTE: If the P&D connector is not supported, a P&D adapter may be supplied with the product.

The PC Theatre display 12 supports the signal interfaces and connectors listed below in Table 2.

TABLE 2

Display Signal Interfaces and Connectors

| SIGNAL | CONNECTOR | SIGNAL USE |
| --- | --- | --- |
| RGB (H&V sync) or TMDS | P&D | Analog or digital video to drive display |
| USB | P&D | Control of display, return of user input, and optional audio support |
| DDC | P&D | For EDID support to identify display |
| Stereo Analog Audio Input | Two RCA jacks | Stereo analog audio input |

Figure 6:
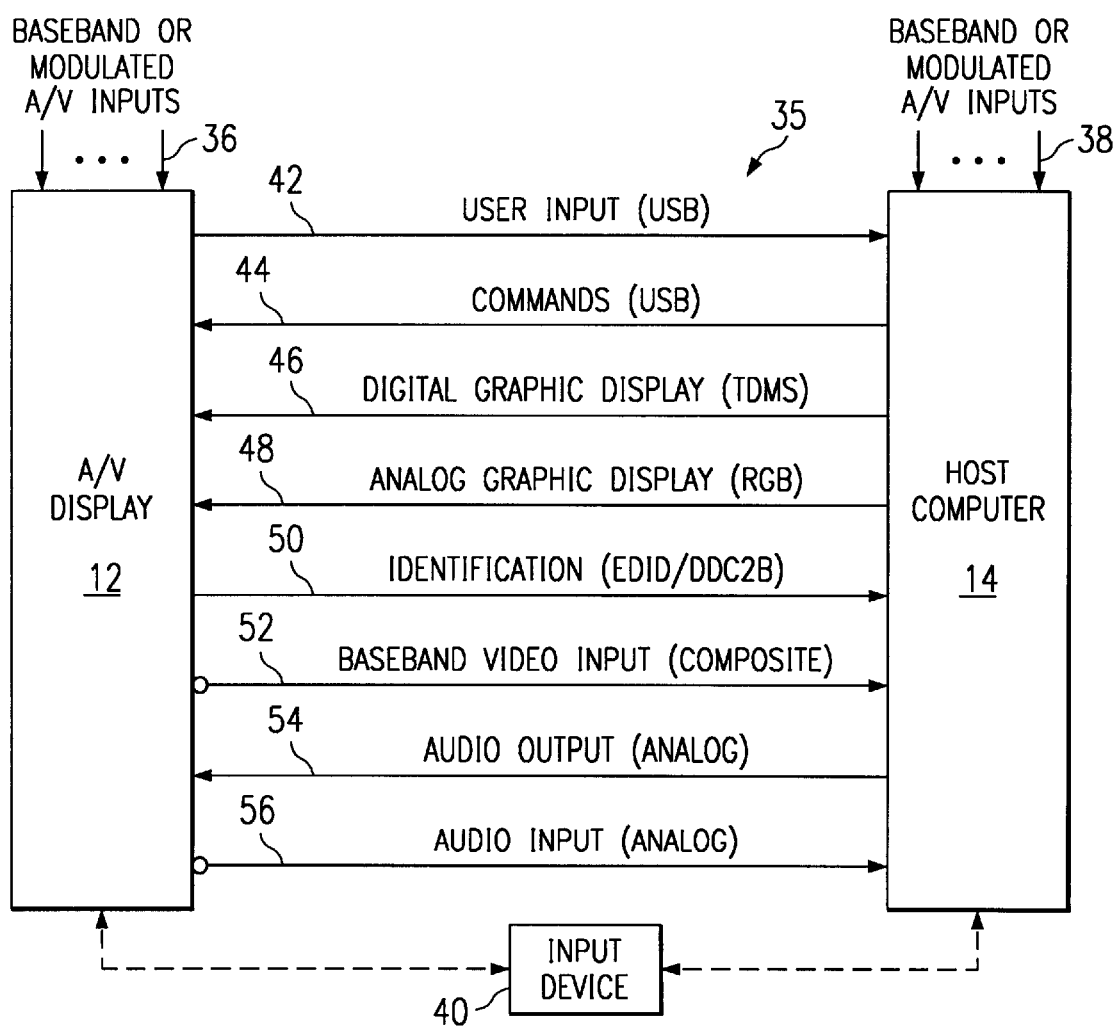
FIG. 6 illustrates PC Theatre signal interfaces between a PC and a display.

The diagram in FIG. 6 shows the PC Theatre communication interface 35 between the PC 14 and display 12, as well as inputs which may be received by the display 12 and the PC 14. The display 12 and the PC 14 may receive baseband or modulated audio/video (A/V) inputs at 36 and 38, respectively, from sources 16 or 18, for instance. The display 12 and the PC 14 may also receive input signals from an additional input device 40, which may include one or more devices, such as a keyboard, mouse, remote control, joystick, etc. In regard to the signal interfaces, the user input and command signals are transmitted on USB lines 42 and 44, the digital graphic display signals are transmitted on a TDMS line 46, the analog graphic display signals are transmitted on an RGB line 48, the display identification signals are transmitted on a line 50, the baseband video input signals are transmitted on a line 52, and the audio output and input signals are transmitted on lines 54 and 56, respectively.

The individual P&D signals in the following Tables are used for PC Theatre functionality. The signals for the PC 14 support both digital and analog displays. The signals for the display 12 are different depending on the type of display.

The PC 14 supports the individual signals listed in Table 3 for the P&D-A/D connector 30.

TABLE 3

System PC P&D-A/D Connector Signals

| PIN | SIGNAL |
| --- | --- |
| 1 | TMDS Data2 + |
| 2 | TMDS Data2 − |
| 3 | TMDS Data2 Return |
| 4 | Sync return |
| 5 | Horizontal sync (TTL) |

TABLE 3-continued

System PC P&D-A/D Connector Signals

| PIN | SIGNAL |
| --- | --- |
| 6 | Vertical sync (TTL) |
| 7 | TMDS Clock Return |
| 8 | Hot Plug Detection (+5 VDC input) |
| 11 | TMDS Data1 + |
| 12 | TMDS Data1 − |
| 13 | TMDS Data1 Return |
| 14 | TMDS Clock + |
| 15 | TMDS Clock − |
| 16 | USB data + |
| 17 | USB data − |
| 18 | USB/1394 common mode shield |
| 21 | TMDS Data0 + |
| 22 | TMDS Data0 − |
| 23 | TMDS Data0 Return |
| 25 | DDC return |
| 26 | DDC data (SDA) |
| 27 | DDC clock (SCL) |
| 28 | +5 VDC (output) |
| C1 | Red Video |
| C2 | Green Video |
| C4 | Blue Video |
| C5 | Video Return |

An analog display 12 supports the individual signals listed in Table 4 for the P&D-A connector 32. It should be noted that the analog audio and S-video paths specified in the original EVC specification are not supported with the P&D-A version of the connector.

TABLE 4

Analog Display P&D-A Signals

| PIN | SIGNAL |
| --- | --- |
| 4 | Sync return |
| 5 | Horizontal sync (TTL) |
| 6 | Vertical sync (TTL) |
| 8 | Hot Plug Detection (+5 VDC output to display) |
| 16 | USB data + |
| 17 | USB data − |
| 18 | USB/1394 common mode shield |
| 25 | DDC return |
| 26 | DDC data (SDA) |
| 27 | DDC clock (SCL) |
| 28 | +5 V DC (input to display) |
| C1 | Red Video |
| C2 | Green Video |
| C4 | Blue Video |
| C5 | Video Return |

The digital display 12 supports the individual signals listed in Table 5 for the P&D-D connector 34.

TABLE 5

Digital Display P&D-D Connector Signals

| PIN | SIGNAL |
| --- | --- |
| 1 | TMDS Data2 + |
| 2 | TMDS Data2 − |
| 3 | TMDS Data Return |
| 7 | TMDS Clock Return |
| 8 | Hot Plug Detection (+5 VDC output to PC) |
| 11 | TMDS Data1 + |
| 12 | TMDS Data1 − |
| 13 | TMDS Data1 Return |
| 14 | TMDS Clock + |
| 15 | TMDS Clock − |

TABLE 5-continued

Digital Display P&D-D Connector Signals

| PIN | SIGNAL |
|---|---|
| 16 | USB data + |
| 17 | USB data − |
| 18 | USB/1394 common mode shield |
| 21 | TMDS Data0 + |
| 22 | TMDS Data0 − |
| 23 | TMDS Data0 Return |
| 25 | DDC return |
| 26 | DDC data (SDA) |
| 27 | DDC clock (SCL) |
| 28 | +5 V DC (input to display) |

The display 12 and the PC 14 may also support the signals in Table 6. These signals are recommended to support IEEE 1394-1995 for the transportation of digital audio and video.

TABLE 6

Additional Signals for PC and Display

| PIN | SIGNAL |
|---|---|
| 9 | 1394 TPA* |
| 10 | 1394 TPA |
| 19 | 1394 Vg |
| 20 | 1394 Vp |
| 29 | 1394 TPB |
| 30 | 1394 TPB* |

In addition to the signal support for the P&D connectors, the PC 14 also provides support for separate analog audio and video connectors. The following specifications may apply for analog audio support:

1. Source impedance—1K ohm maximum.
2. Load impedance—10K ohm minimum.
3. Amplitude—2V RMS maximum, 0.5V RMS nominal.

The PC 14 may also support a line-level stereo analog audio output on a 3.5 mm stereo jack using standard pin assignments. This audio output connector is used to support a separate analog audio cable to drive the audio amplifier in the display 12. In addition, the PC 14 may also support a line-level stereo audio input on a second 3.5 mm stereo jack using standard pin assignments. This audio input connector is used to support a separate audio cable for input of audio. The PC 14 may further support a Composite video connector for Composite video input. A S-video connector may be substituted for the Composite connector if an adapter is provided for a Composite video support.

The display 12 supports a line-level stereo analog audio input on two RCA jacks. In addition, if video output to the PC 14 is supported, the display 12 may also support two RCA jacks for audio output and a composite video connector for video output.

Referring again to the communication interface 35 illustrated in FIG. 6, this interface is used by the PC 14 to identify and control the display 12. As mentioned previously, the interface 35 is implemented using DDC-2B and USB communication links. The VESA DDC-2B standard is a simple interface that is based on the I2C bus. This interface allows the PC 14 to read and write to the display's memory space. In this embodiment, the PC 14 is always the master, and the display 12 is always the slave. Only the PC 14 may initiate a communication transaction.

The interface 35 is used during the boot-up process to allow the PC 14 to query the display 12 for information on its functionality. This information is then used to configure the operating system and video system. DDC2B support is used in both the PC 14 and display 12. The DDC2B section of the VESA DDC Standard V3.0 may be referred to for more information.

The Universal Serial Bus (USB) is a bidirectional serial bus that operates at speeds of 1.5 and 12 Mb/s. The bidirectional functionality of this bus enables both the PC 14 and the display 12 to initiate a communication transaction. This functionality allows the display 12 to inform the PC 14 about events such as a button press on the display's front panel. The PC 14 and display 12 support the USB Monitor Control Class Specification V1.0 and VESA Monitor Control Command Set (MCCS) Standard V1.0 for software control of the display by the PC 14. The PC 14 and the display 12 also support the USB Class Definition for Human Interface Devices (HID) specification V1.0, as well as the USB HID Usage Tables specification V1.0 for transportation of user input from the display 12 back to the PC 14. In addition, the PC 14 supports the USB Device Class Definition for Audio Devices specification V1.0 and USB Device Class Definition for Audio Data Formats specification V1.0 for the support of USB to transport audio.

The PC Theatre system may also support IEEE 1394-1995, which is a high-speed bi-directional serial bus that is capable of speeds greater than 1 Gb/s. This bus is intended to be used to transport video and may also be used to control the display or transport audio. The IEEE 1394-1995 specification may be referred to for more information. Hereafter in this document, IEEE 1394-1995 is referred to as IEEE-1394 or just 1394.

The PC 14 controls the display 12 using USB according to the requirements of the USB Monitor Control Class specification V1.0 and VESA Monitor Control Command Set (MCCS) Standard V1.0. In addition to USB, display control may be supported over DDC2B and 1394. Assuming that the PC 14 supports DDC-2B, USB, and 1394 display communication, the recommended method of establishing communication with the display is to first attempt to communicate with the 1394 interface. If this fails, the PC 14 should then attempt to establish communication with the USB interface. If this fails, the PC 14 should then attempt to establish communication with the DDC-2B interface. If this fails, the PC 14 should assume the display 12 does not support software control and disable the software user control interface.

Figure 7:
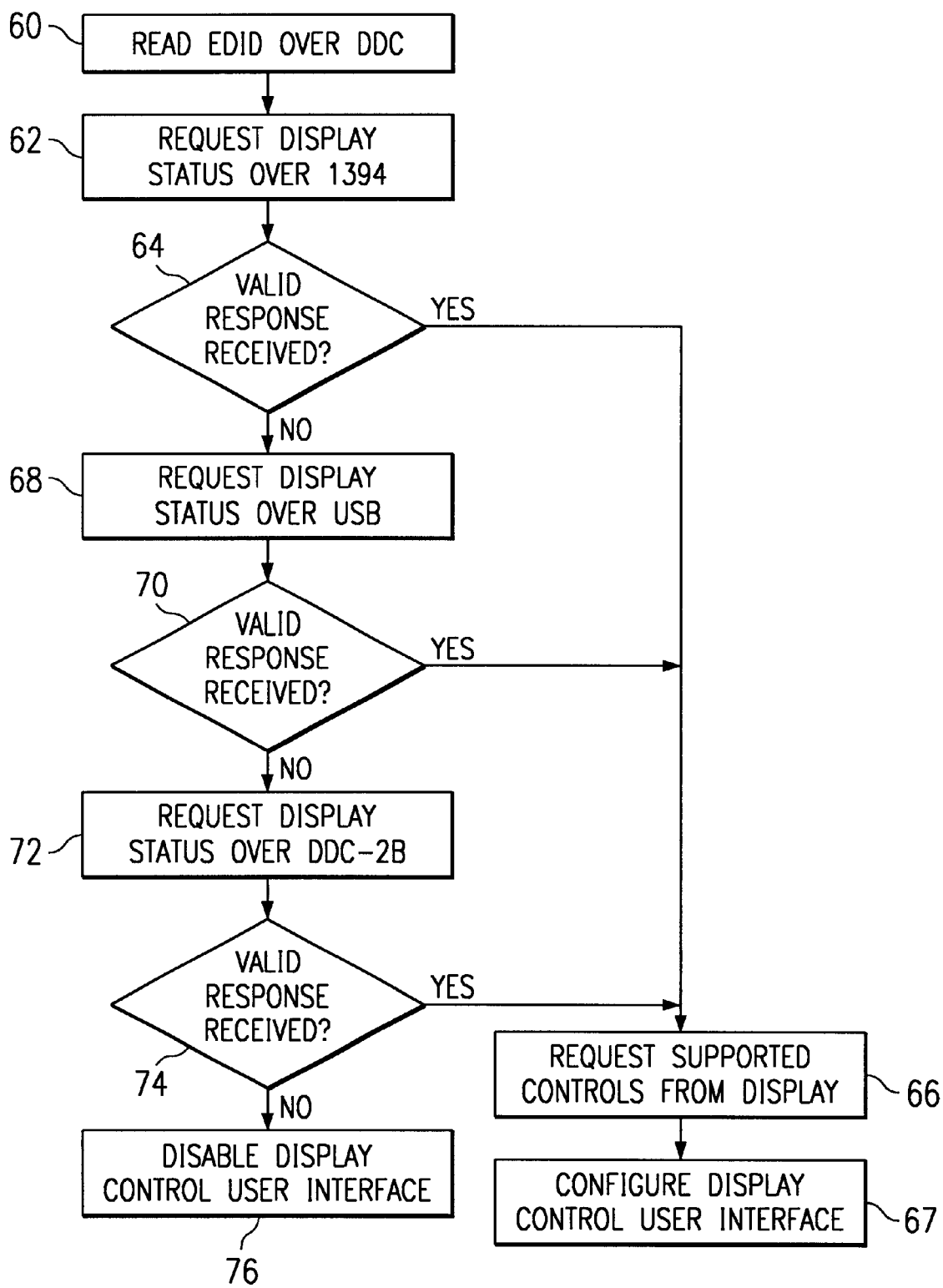
FIG. 7 illustrates a flowchart depicting a process for configuring an interface between a PC and a display.

If communication between the PC 14 and the display 12 is established, the PC 14 requests the supported controls of the display 12 and configures the user interface accordingly. This communication process is described in the block diagram shown in FIG. 7. The PC 14 reads the EDID file stored in the display 12 over the DDC interface. (Block 60). The PC 14 then requests the status of the display 12 over the 1394 interface. (Block 62). If a valid response is received (block 64), the PC 14 requests supported controls from the display 14 and configures the display control user interface. (Blocks 66 and 67). If not, the PC 14 requests the status of the display 12 over the USB interface. (Block 68). If a valid response is received (block 70), the PC 14 again requests supported controls from the display 14 and configures the display control user interface. (Blocks 66 and 67). If not, the PC 14 requests the status of the display 12 over the DC-2B interface. (Block 72). If a valid response is received (block 74), the PC 14 again requests supported controls from the display 14 and configures the display control user interface. (Blocks 66 and 67). If not, the PC 14 disables the display's control user interface. (Block 76).

For identification of the display 12, support of the VESA Extended Display Identification Data (EDID) Standard V3.0 is utilized to communicate the display's capabilities to the PC 14. This information is stored in the display 12 as a condensed memory block.

With this information, the operating system and PC video subsystem can configure themselves for use with the display 12. The support of EDID structure Version 1.1 is advantageously utilized for all PC Theatre products. In addition, EDID Structure version 2.0 is advantageously used for the system unit and digital displays. Version 2.0 of EDID resides at a different memory address in the display 12 to allow both EDID Versions 1.1 and 2.0 to be supported together. Note that if EDID structure Version 2.0 is supported, Version 1.1 support is still used. EDID structure Version 2.0 contains additional information that is used by displays that have additional functionality such as a digital video interface and support of USB. Note the EDID structure version and the version of the EDID standard are not the same. The EDID Standard Version 3.0 may be referred to for information about EDID structures 1.1 and 2.0.

The PC 14 also queries the display 12 for the supported controls over USB according to the USB Monitor Control Class Definition specification V1.0 and VESA Monitor Control Command Set (MCCS) Standard V1.0 requirements. For each supported control, the display 12 is capable of reporting the type (continuous or discrete), the maximum value (the minimum value is assumed to be zero), and the current value. This information is used by the PC 14 to configure the user control interface. This user control interface presents a graphical user interface (GUI) of the supported controls. Only the appropriate user controls that are supported by the display are presented to the user.

The display manufacturer has the option of reporting the support of controls to the PC 14. If the display manufacturer wants to process the user input and generate the OSD internally for a specific control when the display 12 is in slave mode, the display 12 simply does not report the support of the control to the PC 14. For this unreported control, the display 12 intercepts the user commands for this control, processes the commands internally, and generates the OSD internally.

The VESA Monitor Control Command Set NCCS) Standard V1.0 gives a complete list of display controls. This specification is written to be protocol-independent and is used as the basis for the USB Monitor Control Class Definition and the VESA DDC Command Interface (DDC/CI) specifications.

The display controls in Table 7 are utilized for PC Theatre operation with flat panel displays. It should be noted that some of these controls do not apply to all display technologies. If the display technology does not support, or has great difficulty supporting, a specific control, this control can be considered optional. The Brightness and Contrast controls are used to adjust the display for viewing computer graphics in PC mode and full screen video in TV mode. The Volume and Balance controls are used to provide the minimum control of the audio amplifier in the display. It should be noted that the audio controls are not listed in the USB Monitor Control Class Definition specification and VESA Monitor Control Command Set (MCCS) Standard V1.0. Rather, these controls are listed in the USB Audio Class Definition for Audio Devices specification.

TABLE 7

Flat Panel Display Controls for PC Theatre

| COMMAND | DESCRIPTION/VALUE |
|---|---|
| Brightness | Continuous control. Increasing this value increases the brightness level of the display. Unipolar setting: 00h=min |
| Contrast | Continuous control. Increasing this value increases the contrast level of the display. Unipolar setting: 00h=min |
| Volume | Continuous control. Increasing this value causes the volume in the left and right audio channels to increase. Unipolar setting: 00h=mute |
| Balance | Continuous control. Increasing this value maximizes the volume in the right audio channel and the volume in the left audio channel is decreased. Bipolar setting: 00h=max left channel, min right channel |

The display controls in Table 8 are utilized for PC Theatre operation with CRT displays. The Brightness and Contrast controls are used to adjust the display for viewing computer graphics in PC mode and full screen video in TV mode. The geometry controls are used to provide the minimum amount of raster position and size adjustment for a high quality display. The overscan control is used to adjust the display so the edges are not visible in fill screen TV mode. This is used to hide noise commonly found on the edge of the picture. The Volume and Balance controls are used to provide the minimum control of the audio amplifier in the display.

TABLE 8

CRT Display Controls for PC Theatre

| COMMAND | DESCRIPTION/VALUE |
|---|---|
| Brightness | Continuous control. Increasing this value increases the brightness level of the display. Unipolar setting: 00h=min |
| Contrast | Continuous control. Increasing this value increases the contrast level of the display. Unipolar setting: 00h=min |
| Vertical Position | Continuous control. Increasing this value moves the image toward the top of the display. Bipolar setting: 00h=max down |
| Vertical Size | Continuous control. Increasing this value increases the distance between the top and bottom of the image. Bipolar setting: 00h=min size |
| Horizontal Position | Continuous control. Increasing this value moves the image toward the right side of the display. Bipolar setting: 00h=max left |
| Horizontal Size | Continuous control. Increasing this value increases the distance between the left and right sides of the image. Bipolar setting: 00h=min size |
| Overscan | Non-continuous control. This control is used to switch the display into an overscan mode. Note: The display should always power-up into an underscanned mode. The display should not go into an overscanned mode until instructed to do so by the PC. |
| Volume | Continuous control. Increasing this value causes the volume in the left and right audio channels to increase. Unipolar setting: 00h=mute |
| Balance | Continuous control. Increasing this value maximizes the volume in the right audio channel and the volume in the left audio channel is decreased. Bipolar setting: 00h=max left channel, min right channel |

The controls in Table 9 are recommended for PC Theatre functionality in addition to the controls listed in the previous tables. It should be noted that some controls do not apply to flat panel technologies.

TABLE 9

Additional Display Controls for PC Theatre

| COMMAND | DESCRIPTION/VALUE |
|---|---|
| Tilt control | Continuous control. Increasing this value rotates the image in a clockwise direction. Bipolar setting: 00h=max counter clockwise |
| Color Temperature | Continuous or non-continuous control. This control is used to change the color temperature of the display. |
| TV Mode | Non-continuous control. This control is used to switch the display into a mode that enhances the video for watching TV. |
| Stand Alone Mode | Non-continuous control. This control is used to switch the display from a stand-alone mode to a slave mode. Stand-alone mode: 1. Generate OSD internally 2. Process user input internally 3. Disable USB control interface Slave mode: 1. Disable OSD 2. Pass all user input to PC for processing 3. Enable USB control interface |
| Disable On Screen Display (OSD) | Non-continuous control. This control is used to enable the OSD when in slave mode. This is to allow the display to generate the OSD instead of the PC. |

For a complete list of additional controls, the VESA Monitor Control Command Set (MCCS) Standard V1.0 may be consulted. It should also be noted that an address block has been reserved for manufacturer specific controls in this standard.

In this embodiment, the PC 14 supports all CRT controls listed in Table 8, as well as all additional controls listed in Table 9. Support for these controls on the PC 14 includes the ability to query the display 12 for supported controls over USB, configure and present a user interface, and send control commands to the display 12 over USB. The display 12 does not store the control settings used for each mode, as the PC 14 will update the display settings after each mode change.

The user input from the display's front button panel and remote control is passed back to the PC 14, via USB for processing according to the USB Class Definition for Human Interface Devices (HID) specification V1.0 and the USB HID Usage Tables specification V1.0. Sending all user input to the PC 14 for processing allows the display 12 and PC 14 to act as one system with a common user interface. A front button panel and IR receiver is used to operate as USB devices. Note that this does not mean the front button panel and IR receiver have to be actual USB devices. The display 12 may only present a USB control interface to the PC 14, but may control these devices internally with an I²C or other type of control bus.

The communication between the PC 14 and the display's button panel and IR receiver may be standardized to insure compatibility. The USB Class Definition for Human Interface Devices (HID) specification V1.0 defines the communication and the USB HID Usage Table specification V1.0 specifies the address values to be used for each control. Refer to these specifications for more information. Note the manufacturer is free to use any IR or RF protocol for wireless input devices, as they are not specified in this standard.

For PC Theatre functionality, the input controls in Table 10 are supported on the PC 14. Support for these user controls includes the ability to receive these controls over USB, decode the control commands according to the USB HID Usage Table specification V1.0, present the appropriate user interface, and respond to the control either internally or send a control command to the display. It is advantageous for the controls listed in Table 10 to be supported by the PC 14, although the PC 14 may also support additional control codes.

TABLE 10

Display Support for HID

| USAGE NAME | DESCRIPTION |
|---|---|
| Digits 0–9 | Digits for the random selection of television channels or other applications. |
| Volume UP/DOWN | Volume Control. |
| Channel UP/DOWN | Sequential channel changing via Up/Down commands. |
| Power | Power control for system. Power down does not necessarily represent lack of system power. |
| Mute | Instant volume mute. |
| Menu | Initiates on-device-display main menu. Sets a mode where the other menu controls are active. A subsequent menu press will cancel the mode. |
| Menu Pick | Pick item from an on-screen menu. |
| Menu UP/DOWN/LEFT/RIGHT | Menu navigation controls. |

The VESA Display Power Management Signaling (DPMS) Standard V1.1 may specify the operation of low power states in the display 12, and DPMS can be used by the PC 14 to control the power state of the display 12. The modes of DPMS are ON, STANDBY, SUSPEND, and ACTIVE-OFF. When both the horizontal and vertical syncs are active, the display 12 is fully active and in the ON state. The display 12 enters the STANDBY state when only the vertical sync is active. In this mode, the screen is blanked, but the display 12 remains fully active. The display 12 enters the SUSPEND state when only the horizontal sync is active. In this mode, the display 12 either enters a very low power state or the ACTIVE-OFF state. In the ACTIVE-OFF state, neither the horizontal nor vertical syncs are active. In this mode, the display's electronics should be completely shut down, with the exception of the microcontroller, USB interface, and IR receiver. If both of the syncs are restored, the display 12 enters the ON state.

TABLE 11

DPMS Modes

| STATE | H SYNC | V SYNC | REQUIREMENT | POWER SAVINGS |
|---|---|---|---|---|
| On | Active | Active | Mandatory | None |
| Standby | No | Active | Mandatory-PC Only | Minimal |
| Suspend | Active | No | Mandatory-PC Only | Substantial |
| Off | No | No | Mandatory | Maximum |

In this embodiment, the PC 14 supports all four DPMS states (ON, STANDBY, SUSPEND, and ACTIVE-OFF). The PC 14 reads the EDID data from the display 12 to determine the supported DPMS modes. For digital displays that only support ACTIVE-OFF, it is recommended that the TMDS transmitter be turned off for all DPMS modes.

The display advantageously provides DPMS support as well. To provide a minimum level of support, the display 12 would include only two modes: a fully active mode and a low power mode. Of course, but fill support of DPMS by the display is typically advantageous.

The display 12 monitors the vertical sync line. If this sync line is active, the display 12 is fully active for the ON and STANDBY modes. If the vertical sync is not active, the display 12 enters a low power state to support SUSPEND and ACTIVE-OFF modes. In this low power mode, the power LED on the front panel is extinguished (or changes color) and the microcontroller, USB interface, and IR receiver remain active. The USB Specification V1.1 may be consulted for information about USB power management.

Both analog and digital displays go into a low power state if any of the video data or timing signals are out of range or are invalid. It is recommended that an OSD be used to communicate the problem to the consumer.

The PC Theatre display 12 and PC 14 support two modes of operation: TV and PC. Each mode is advantageously configured for the best video quality of the mode. For example, the PC mode is displayed with the best settings for computer graphics, and the TV mode is displayed with the best settings for TV video. Special video enhancements may be used in TV mode for video that is more like that of a standard TV. Examples of such video enhancements are velocity scan modulation, white peaking, black stretch, and flesh tone correction. The Display-Mode control in the VESA Monitor Control Command Set (MCCS) Standard V1.0 may be used by the PC 14 to enable these display video enhancements in TV mode and disable them in PC mode. Table 12 contains the typical video modes supported by both the PC 14 and display 12.

TABLE 12

Video Modes

| Format | Horizontal Frequency (kHz) | Vertical Frequency (Hz) | Standard Type |
|---|---|---|---|
| 640 × 350 | 31.5 | 70 | Industry Standard |
| 640 × 400 | 31.5 | 70 | Industry Standard |
| 720 × 400 | 31.5 | 70 | Industry Standard |
| 640 × 480 | 31.5 | 59.95, 60 | Industry Standard |
| 720 × 480 | 31.5 | 59.94 | VESA (proposed) |

In addition to the video modes listed in Table 12, support of the video modes listed in Table 13 may also be considered for the PC Theatre PC 14 and display 12.

TABLE 13

Additional Video Modes

| Format | Vertical Frequency (Hz) | Standard Type |
|---|---|---|
| 640 × 480 | 72, 75, 85 | VESA |
| 720 × 576 (for PAL support) | 50 | IEC 1146 ITU-R Report 624-4 |
| 800 × 600 | 59.94, 60, 72, 75, 85 | VESA |
| 1024 × 768 | 59.94, 60, 70, 75, 85 | VESA |
| 1280 × 1024 | 59.94, 60, 75, 85 | VESA |

Digital TV support is recommended for both the PC Theatre PC 14 and display 12. The ATSC specifications may be consulted for information about the digital television formats. Although detailed information about video modes is beyond the scope of this specification, the following standards may be studied for more information about the video modes listed in Tables 12 and 13: VESA Display Monitor Timing Specifications (DMTS), Version 1.7, Dec. 18, 1996; Digital Television Standard for HDTV Transmission, ATSC A/53, 1995; Guide to the Use of the Digital Television Standard for HDTV Transmission, ATSC A/54, 1995; Program for System Information for Terrestrial Broadcast and Cable, ATSC A/65, 1997; Basic Parameter Values For The HDTV Standard For The Studio And For International Programme Exchange—Section 11A— Characteristics of Systems for Monochrome and Colour Television, ITU-R BT.709, 1990; National Television Standards Committee (NTSC), ITU-R Report 624-4, 1990; and PAL (Phase Alternating Line), Video Cameras (PAL/SECAM/NTSC)—Methods of Measurement—Part 1: Non-Broadcast, Single-Sensor Cameras, First Edition, IEC 1146; ITU-R Report 624-4, 1994.

Advantageously, the PC 14 and the display 12 share resources to prevent unnecessary duplication of components. For example, if the display 12 has an optional television tuner, the PC 14 can make use of this device to provide Picture-In a-Picture (PIP) functionality. The display 12 can support software control of the tuner and a video multiplexer via USB. The PC 14 sends USB commands to the tuner, and uses the Output Source Select 1 control in the VESA Monitor Control Command Set (MCCS) Standard V1.0 to select it as the output video source. The composite video is sent to the PC 14 through a separate cable to the Composite Video input connector The PC 14 and the display 12 may also support USB television tuner controls that allow the PC 14 to control the tuner 12 in the display. For these controls the channel map is stored and controlled by the PC 14.

The use of the display's connector panel by the PC 14 greatly increases the flexibility and expandability of the system. If the desired video source is connected to the display 12, the PC 14 can select the source via USB with the Output Source Select 1 control in the VESA Monitor Control Command Set (MCCS) Standard V1.0 and receive the composite video through separate cable to the Composite Video input connector.

The PC 14 and the display 12 have many possible configurations depending upon the price-point and level of functionality required. Two possible configurations are described herein. The first configuration is a minimalistic configuration for PC Theatre functionality, while the second configuration includes additional support that may be included for full PC Theatre functionality.

Figure 8:
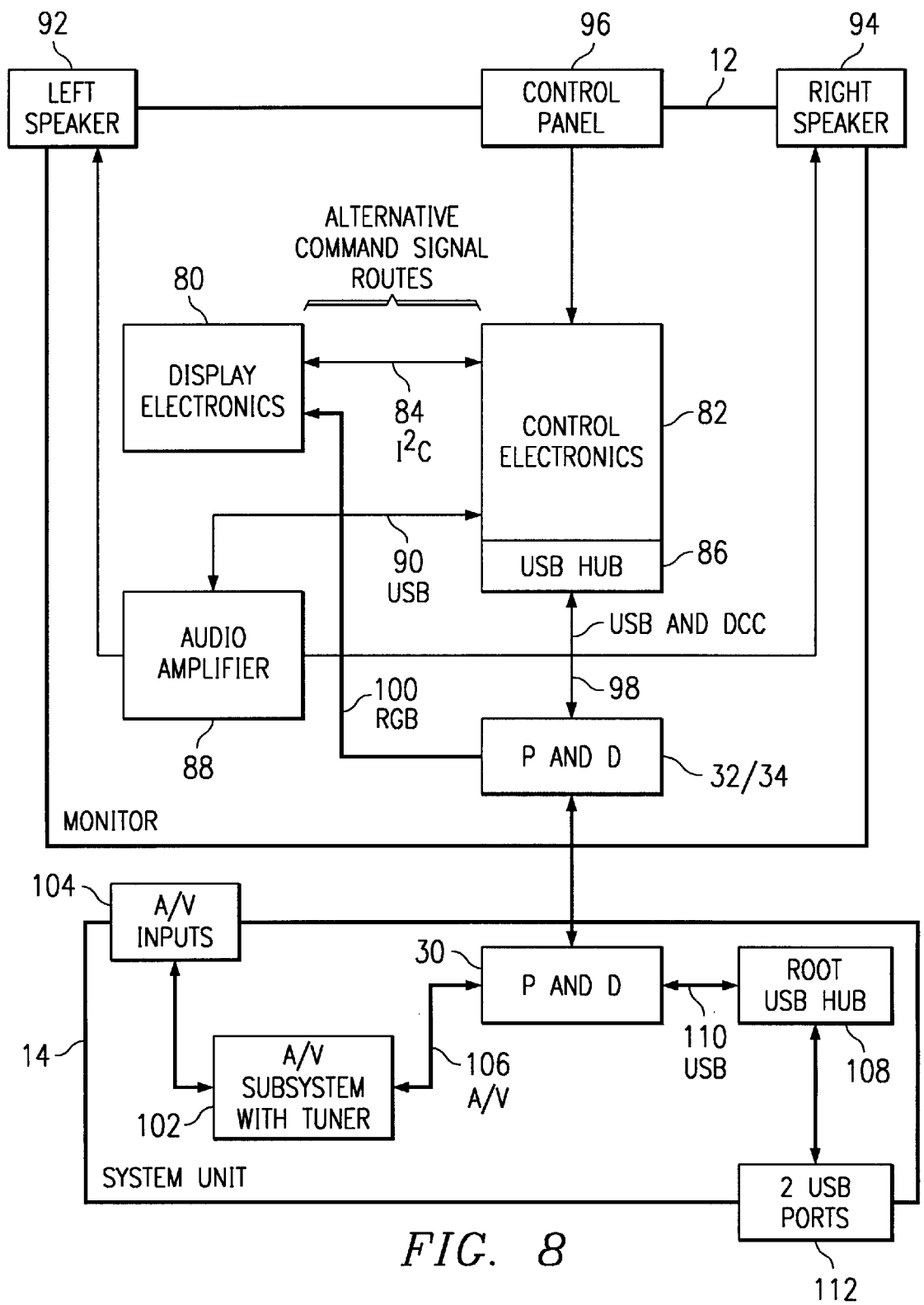
FIG. 8 illustrates a detailed block diagram of one embodiment of a PC Theatre system.

The block diagram in FIG. 8 illustrates the PC Theatre system 10 in the first configuration. The key subsystems of the display 12 are represented as blocks in order to simplify the diagram. The display electronics 80 represents all the functionality of a standard VGA monitor. The control electronics 82 is coupled to the display electronics 80 by an $I^2C$ bus 84, and it represents the display microcontroller communication and control functionality. The USB hub 86 is shown to be part of the control electronics 82 as this functionality can be integrated into the main display microcontroller. The control electronics 82 is coupled to an audio amplifier 88 by a USB bus 90, which in turn is coupled to a left speaker 92 and a right speaker 94.

The control electronics 82 may receive input signals from a control panel 96, and input and output signals may pass to a from the control electronics via the USB hub 86 which is coupled to the appropriate P&D connector 32 or 34 via a USB and DDC interface 98. The display electronics 80 may receive command signals from the control electronics 82 via the $I^2C$ bus 84 or from the PC 14 directly via an RGB interface 100 that is coupled to the P&D connector 32 or 34.

The PC 14 includes an A/V subsystem with tuner 102 that receives input signals from various A/V inputs 104. The A/V subsystem 102 is coupled to the P&D connector 30 via an A/V interface 106. The PC 14 also includes a root USB hub 108 that is coupled to the P&D connector 30 via a USB interface 110 and that is also coupled to USB ports 112.

As can be seen from FIG. 8, in the first configuration, the PC 14 supports the following functionality:

USB (12 Mb/s)

Audio (USB and Analog)

P&D-A/D connector with signals support listed in Table 3

A/V subsystem

The PC 14 also supports a root USB hub 108 and the software for 12 Mb/s USB functionality. The PC 14 supports the USB Monitor Control Class Specification V1.0 and VESA Monitor Control Command Set (MCCS) Standard V1.0 for software control of the display 12 by the PC 14. This control of the display 12 includes querying the monitor for supported controls, configuring to support all controls, and providing a user interface to allow the consumer to adjust the display settings. The PC 14 also supports the USB Class Definition for Human Interface Devices (HID) specification V1.0, and the USB HID Usage Tables specification V1.0 for transportation of user input from the display 12 back to the PC 14. In addition, the PC 14 supports the USB Device Class Definition for Audio Devices specification V1.0 and USB Device Class Definition for Audio Data Formats specification V1.0 for the support of USB to transport audio.

In regard to audio, the PC 14 supports both USB and analog stereo audio output to the display 12. For USB Audio, the PC 14 is capable of sending uncompressed linear 16-bit stereo audio to the display via USB according to the USB Device Class Definition for Audio Data Formats specification V1.0. The PC 14 first queries the display 12 to determine if USB audio is supported before this functionality is enabled. The PC 14 also supports a line-level analog audio output. The connector for this output may be a 3.5 mm stereo audio jack. The PC 14 controls the display's audio amplifier 88 via USB for both USB and analog audio monitors according to the USB Device Class Definition for Audio Devices specification V1.0.

The PC's A/V subsystem 102 is capable of combining PC and TV video sources and sending the combined video to the display 12. This A/V subsystem 102 is capable of processing video and audio from the optional internal tuner, an optional tuner in the display 12, and input through the rear connector panel. The PC 14 also supports at least one Composite video input connector, as well as two 3.5 mm stereo jacks for input and output of line-level stereo audio.

In this first configuration, the display 12 supports the following functionality:

USB Control (1.5 Mb/s)

Analog Audio Amplifier

Standard VGA monitor electronics

The display 12 also supports 1.5 Mb/s USB functionality to enable control by the PC 14. Note that the support of 1.5 Mb/s does not allow down-stream USB connectors or audio to be supported. The display 12 further provides a standard HID monitor control interface to the PC 14 according to the USB Monitor Control Class Specification V1.0 and is capable of reporting supported controls, reporting current status, and receiving control commands from the PC 14.

The display 12 also may include a stereo audio amplifier 88 to process analog audio received from the PC 14. For analog audio input, the display 12 supports two RCA audio connectors on the back panel, and analog audio typically utilizes an additional cable between the PC 14 and display 12. The audio amplifier 88 acts as a separate USB device and follows the requirements of the USB Device Class Definition for Audio Devices specification V1.0.

The display 12 supports the video electronics of a standard monitor. The display 12 receives either analog RGB video or digital TMDS video through the appropriate P&D connector 32 or 34 and displays the video according to the user settings.

Figure 9:
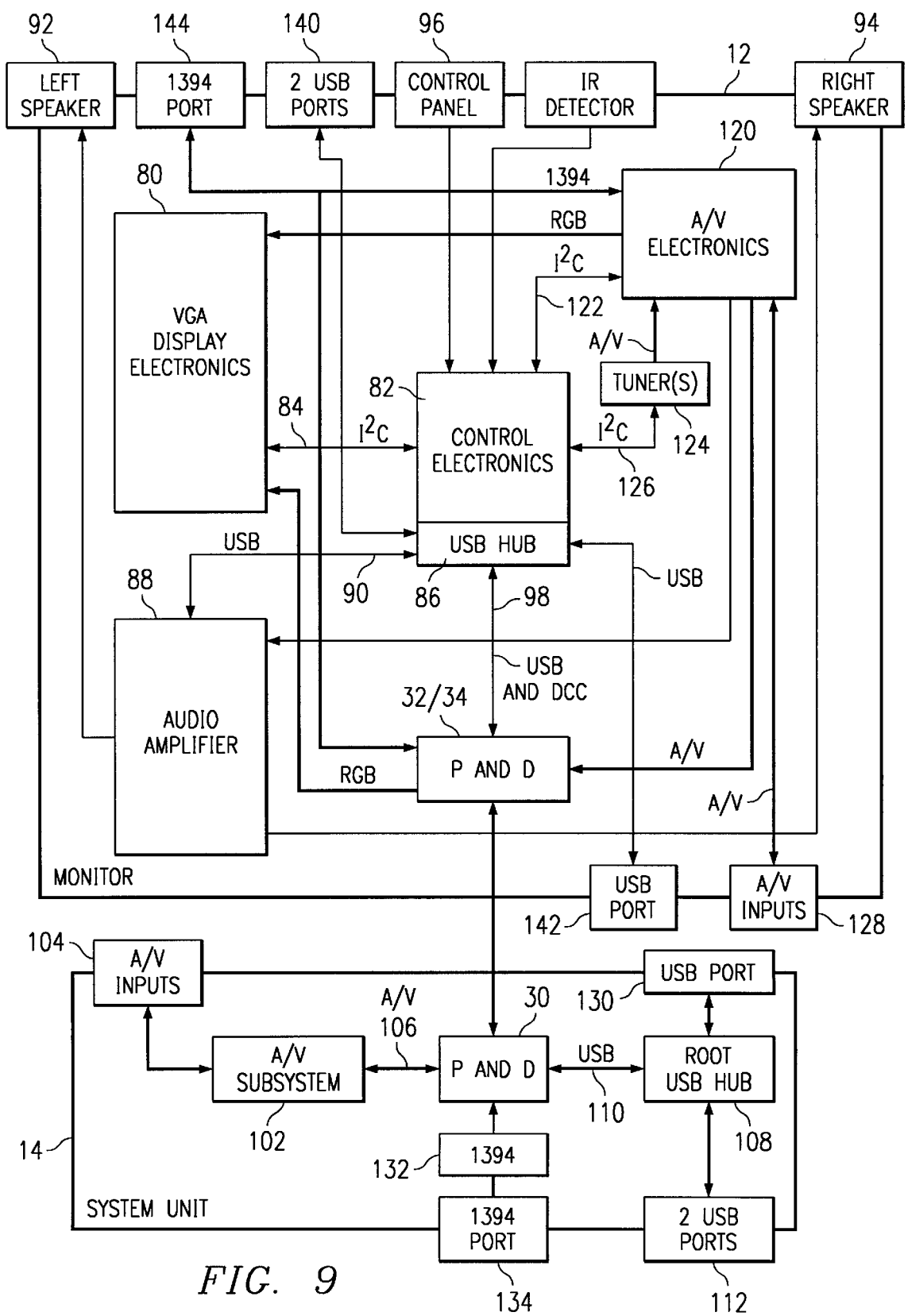
FIG. 9 illustrates a detailed block diagram of another embodiment of a PC Theatre system.

The block diagram in FIG. 9 illustrates the PC Theatre system 10 in the second configuration. Like FIG. 8, the key subsystems of the display 12 are represented as blocks in order to simplify the diagram. Also, in the interest of clarity, reference numerals of previously discussed elements are used to designate like elements illustrated in FIG. 9. The it display electronics 80 represents all the functionality of a standard VGA monitor. The control electronics 82 is coupled to the display electronics 80 by an $I^2C$ bus 84, and it represents the display microcontroller communication and control functionality. The USB hub 86 is shown to be part of the control electronics 82 as this functionality can be integrated into the main display microcontroller. The control electronics 82 is coupled to an audio amplifier 88 by a USB bus 90, which in turn is coupled to a left speaker 92 and a right speaker 94.

The A/V electronics 120 represents additional functionality that has been added to the display 12 to support stand-alone TV functionality. The A/V electronics 120 may be coupled directly to the control electronics 82 by an $I^2C$ interface 122, or the A/V electronics may be coupled to a tuner 124 which is coupled to the control electronics 82 by an $I^2C$ interface 126. The A/V electronics may also receive or transmit signals via the A/V ports 128.

The control electronics 82 may receive input signals from a control panel 96, and input and output signals may pass to a from the control electronics via the USB hub 86 which is coupled to the appropriate P&D connector 32 or 34 via a USB and DDC interface 98. The display electronics 80 may receive command signals from the control electronics 82 via the $I^2C$ bus 84 or from the PC 14 directly via an RGB interface 100 that is coupled to the P&D connector 32 or 34.

Like the first configuration, the PC 14 includes an A/V subsystem with tuner 102 that receives input signals from various A/V inputs 104. The A/V subsystem 102 is coupled to the P&D connector 30 via and A/V interface 106. The PC 14 also includes a root USB hub 108 that is coupled to the P&D connector 30 via a USB interface 110 and that is also coupled to USB ports 112. In addition to the first configuration, the PC 14 may include a USB port 130 that is coupled to the root USB hub 108. Also, the PC 14 may include a 1394_132 which receives signals from the 1394 port 134 and transfers these signals to the P&D connector 30.

As can be seen from FIG. 9, in the second configuration, the PC 14 may support the following features that are in addition to the functionality described above in relation to the first confiruation:

Additional USB Connectors

Additional A/V Connectors

Tuner

IEEE-1394 Support

In addition to USB support through the P&D connector 30, the PC 14 may support USB connectors on the front and rear panel through the ports 112 and 130. In addition to the single Composite Video connector supported in the first configuration, the PC 14 may also support other video connectors (Composite and S-video) on the front and/or rear panels. The PC may also support an internal tuner for watching TV without the need for the tuner 124 in the display 12. Also, the PC 14 may provide support for IEEE-1394 to the display 12 through the P&D connector 30, and the PC 14 may support 1394 connectors on the front and/or rear panels via the 1394 ports 134.

In this second configuration, the display 12 may support the following features that are in addition to the functionality described above in relation to the first configuration:

Stand-alone TV Functionality

Front Button Panel

Remote Control and IR Receiver

USB Connectors and Audio Support

IEEE-1394 Support

The display 12 may support two modes of operation: stand-alone mode and slave mode. In stand-alone mode, the display 12 operates as a standard TV. In addition to the standard monitor electronics, the display 12 also includes a video and audio subsystem embodied in the ANV electronics 120 capable of providing stand-alone TV functionality. This subsystem may include a tuner or tuners 124, A/V connectors 128 on the back panel, and video and audio multiplexers.

This subsystem has two modes of operation. When in stand-alone mode, this subsystem provides the functionality necessary for stand-alone TV operation. When connected to a PC Theatre PC 14 and in slave-mode, the video from the tuner 124 or A/V connectors may be selected and sent to the PC 14 via the control electronics 82 for processing. In slave mode, the display 12 passes all user input to the PC 14 for processing, disables the On Screen Display (OSD), displays the VGA video from the PC 14, and responds to USB commands from the PC 14.

The display's front panel 96 can include buttons for Channel-Up, Channel-Down, Volume-Up, Volume-Down, Menu, Select, Power, etc. These buttons on the front panel have two modes of operation. When the display 12 is in stand-alone mode, the control electronics 82 responds directly to a button press. When the display 12 is connected to a PC Theatre PC 14 and in slave mode, the display 12 sends a USB command to the PC 14 when a button is pressed and does not generate an OSD internally. The USB command may be sent according to the requirements of the USB Class Definition for Human Interface Devices (HID) specification V1.0, and the USB HID Usage Tables specification V1.0. The PC 14 then processes the user input.

As mentioned previously, the display 12 may include a remote control and IR or RF receiver. The receiver may also have two modes of operation. When the display 12 is in stand-alone mode, the receiver data from the remote is processed internally. When the display 12 is connected to the PC 14 and in slave mode, the remote button presses are sent as USB commands to the PC 14 according to the requirements of the USB Class Definition for Human Interface Devices (HID) specification V1.0, and the USB HID Usage Tables specification V1.0. The PC 14 then processes the user input.

The display 12 may include a 12 Mb/s USB hub and external USB connectors 140 and 142. The connectors 140 and 142 may be on the front and/or rear panel. Note that USB connectors are typically connected to the PC 14 regardless of the display's power state (On or Active-Off) and operational mode (stand-alone or slave). The display 12 may also support USB audio. For USB audio support, the audio amplifier 88 receives the uncompressed linear stereo 16-bit USB audio stream through the P&D connector according to the requirements of the USB Device Class Definition for Audio Data Formats V1.0.

The display 12 may support IEEE-1394 video processing and connectors 144 on the front and/or rear panel. Note that 1394 connectors are typically connected to the PC 14 regardless of the display's power state (On or Active-Off) and operational mode (stand-alone or slave).

Next, a high level description the operational procedures utilized for the PC 14 and the display 12 is presented to provide PC Theatre functionality and to insure compatibility. The appropriate VESA or USB specification may be consulted for more information.

The startup procedures for a PC Theatre system 10 as it initializes itself are described below. The PC Theatre system startup procedures are as follows:

Determine if an active display is connected to the system. This is determined by checking to see if the voltage on pin 8 of the P&D connector is greater than +2 VDC.

Attempt to read the 256 KB EDID data structure 2.0 at the I²C slave address of A2h.

If the read was successful, determine if the EDID 2.0 data is valid by checking the checksum of the EDID structure.

If the EDID 2.0 data is valid, parse and store the data.

With the parsed EDID 2.0 data, configure the video subsystem and activate appropriate video interface (RGB or TMDS).

If the attempt to read the EDID 2.0 data fails, attempt to read the 128 KB EDID data structure 1.1 at the I²C slave address of A0h.

Determine if the EDID 1.1 data is valid by checking the checksum of the EDID structure.

If EDID 1.1 data is valid, parse and store data

With parsed data, configure the video subsystem and activate the appropriate video interface (RGB or TMDS). For a digital display, assume the default configuration of 24 bit MSB-aligned RGB TFT.

If the attempt to read the EDID 1.1 data fails, assume the display does not support DDC and use default RGB video settings.

Request status from HID monitor control device via USB.

If a valid response is received from the display, request the list of supported controls and the type and range of each control.

With the data of supported controls, configure the display control panel user interface.

Check the list of monitor supported controls to determine if a tuner is supported.

If tuner controls are supported, configure the user interface to use the tuner and configure the video subsystem to receive the video through the Composite video connector.

Check the list of monitor supported controls to determine if the Output Source Select control is supported.

If this output control is supported, configure the user interface to use the rear connector panel of the display and configure the video subsystem to receive the video through the Composite video connector.

Check to see if the default control values of the display are stored internally.

If the default values have not been stored internally, restore the default values of the display using the RestoreFactoryDefault or RestoreSaved command (if supported). Read all of the displays picture quality and geometry control settings and store them internally as the defaults. Repeat the process for each supported DisplayMode (Productivity, Games, Movies).

Request the status of the USB audio amplifier in the display.

If a valid response is received, request the supported audio controls and configure internal audio subsystem to send USB audio to the display using a supported format (compressed, uncompressed, number of channels, etc).

If a valid USB response is not received, assume display does not support PC Theatre functionality and disable the user interface.

If the display is in Stand-alone mode, use the Display Transition procedures to change the display to Slave mode.

Next, the startup procedures for the PC Theatre display 12 as it initializes itself are described below. The display 12 startup procedures are as follows:

1. Perform normal initialization procedures for either a standard monitor or TV.
2. Set all controls using internally stored settings.
3. For a stand-alone TV, set the status of the internal Operation Mode control to Stand-alone and operate as a standard TV.
4. If the display does not support stand-alone operation, set the status of the internal Operation Mode control to Slave and operate as a standard monitor.

The mode transition procedures are described below for the PC 14 as this device transitions the display 12 from stand-alone mode to slave mode or slave mode to stand-alone mode. The procedures for transitioning the display 12 from stand-alone mode to slave mode are as follows:

1. Send an Operation Mode command to the display to switch to Slave mode. This enables the PC to control the display.
2. Read back the status of the Operation Mode control. Do not send other USB commands to the display until the status of this control indicates Slave mode. Repeat the read process if necessary.
3. Send an Input Source Select command to switch the display to the P&D input. This enables the PC to drive the video input of the display.
4. If the computer is in TV mode, and the controls are supported, send a Scan Format command to switch the display to Overscan and a Display Mode command to switch the display to Movies which enables the TV video enhancements. In addition, disable internal screen savers and DPMS operation.
5. If the computer is in PC mode, and the controls are supported, send a Scan Format command to switch the display to Underscan and a Display Mode command to switch the display to Productivity which disables the TV video enhancements.
6. Send appropriate video quality and geometry commands to the display for the current mode.

The procedures for transitioning the display 12 from slave mode to stand-alone mode are as follows:

1. Send Operation Mode command to the display to switch to Stand-alone mode.
2. Disable USB command communication to the display.

The mode transition procedures are described below for the display 12 as it transitions from stand-alone mode to slave mode or slave mode to stand-alone mode. The PC Theatre display procedures for transitioning from stand-alone mode to slave mode are as follows:

1. Wait until internal transition is complete before reporting the status of the Operation Mode command as set to Slave.
2. Enable the reception of other USB commands from the PC.
3. Enable DPMS operation of the display.
4. Disable internal processing of user input from remote and front button panel.
5. Send all user commands to the PC for processing over USB.
6. Disable internal OSD.

The procedures for transitioning the display 12 from slave mode to stand-alone mode are as follows:

1. Wait until internal transition is complete before reporting the status of the Operation Mode command as set to Stand-Alone.
2. Disable the reception of all USB commands except Operation Mode and status from the PC.
3. Disable DPMS operation of the display.
4. Enable internal processing of user input from remote and front button panel.
5. Disable sending all user commands to the PC.
6. Enable internal generation of user interface.
7. Restore internal default values for picture quality and geometry.
8. Switch Input Source Select to Tuner.
9. Resume normal TV operation.

The normal operation procedure is describe below for a fully active PC 14.

1. Process all user input from keyboard, mouse, gamepad, and display.
2. Display the appropriate user interface.
3. Control internal subsystems.
4. Send control commands to the display.

The normal operation procedure is described below for the PC Theatre display 12. The PC Theatre display 12 normal operation procedures for stand-alone mode are as follows:

1. Process all user input internally.
2. Display appropriate user interface.
3. Send appropriate control commands to internal subsystems.

The PC Theatre display normal operation procedures for stand-alone mode are as follows:

1. Send all user input to the PC for processing.
2. Disable internal display of user interface.
3. Disable internal control of display subsystems.

The shutdown procedure is described below for a PC Theatre PC 14 as this device transitions to a sleep mode.

1. Send Operation Mode command to the display to switch to Stand-alone mode.
2. Perform normal shut down procedures for a PC.

The shutdown procedure is described below for a PC Theatre display 12 as this device transitions to a sleep mode.

1. If the display is in Slave mode, pass the user shutdown command to the PC for processing.
2. If the display is in Stand-alone mode, perform normal shutdown procedures.
3. Ignore all USB commands from the PC after shutdown.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A PC Theatre system comprising:
 a video display including a first multi-pin plug and display connector coupled by a bi-directional universal serial bus hub signal connector to video display control electronics;

a computer including a second multi-pin plug and display connector, the first plug and display connector being connectable to the second plug and display connector by a pin-to-pin plug and display connector link;

said first and second plug and display connector pins providing respective video signal paths, audio signal paths, and control signal paths;

the computer also including an audio/video input adapted to receive audio signals and video signals and coupled to supply such received signals to said second plug and play connector; and said computer including an audio/video signal processor coupled to the audio/video input for processing the audio signals and the video signals, wherein the audio signals and the video signals are communicated between the video display and the computer via the first and second plug and display connectors.

2. The system as set forth in claim 1, wherein the first plug and display connector provides analog video signal paths.

3. The system as set forth in claim 1, wherein the first plug and display connector provides digital video signal paths comprises a digital plug and display connector.

4. The system as set forth in claim 1, wherein the second plug and display connector provides both analog and digital video signal paths.

5. A system comprising:

a computer including an audio/video input coupled by a signal processor to a first multi-pin plug and display connector providing respective analog and digital video signal paths; and a display including display electronics coupled to control electronics, and a universal bidirectional serial bus hub signal interface coupling said control electronics to a second multi-pin plug and display connector providing at least analog video signal paths or at least digital video signal paths; said display also including a user display control input interface coupled to said control electronics;

a bi-directional plug and display connector link providing pin-to-pin connections between said first and second plug and display connectors such that audio/video signals received by said audio/video input are communicated by said signal processor to said first plug and display connector and via said connector link and said second plug and display connector to said display;

said display further storing display parameter information accessible by said computer to permit exchange of signals in both directions between said computer and said display over said universal serial bus hub and said first and second plug and display connectors to enable configuration of said user control interface of said display and of said signal processor by said computer.

6. The system as set forth in claim 5, wherein said signal processor includes a tuner.

7. The system as set forth in claim 5, wherein said computer also includes a bi-directional universal serial hub connected to a plurality of universal serial bus ports and by a bi-directional universal serial bus interface to said first plug and display connector.

8. The system as set forth in claim 5, wherein said display includes a video signal connection between said second plug and display connector and said display electronics.

9. The system as set forth in claim 5, wherein said display includes an audio amplifier coupled by a USB connection to said control electronics, and at least one speaker coupled to said audio amplifier.

10. The system as set forth in claim 5, wherein said display further includes audio/video electronics coupled to said display electronics, to said control electronics, and to at least one of a tuner in said display and an audio/video input/output of said display, and bi-directional signal communication paths between said audio/video electronics and respective audio/video input and output connectors.

11. The system as set forth in claim 5, wherein the display is operable to generate a vertical sync line which is monitored to effect power management control of the display between different power mode states.

12. A system comprising:

a computer including an audio/video input coupled by a signal processor to a first multi-pin plug and display connector providing respective analog and digital video signal paths; and a display including display electronics coupled to control electronics, and a first universal bi-directional serial bus hub signal interface coupling said control electronics to a second multi-pin plug and display connector providing at least analog video signal paths or at least digital video signal paths; said display also including a user display control input interface coupled to said control electronics;

said computer including a second bi-directional universal serial hub connected to a plurality of universal serial bus ports and by a bi-directional universal serial bus interface to said first plug and display connector;

said display also including an audio amplifier coupled to at least one speaker, said audio amplifier also coupled by a bi-directional USB connection to serial hub control electronics; and wherein said first and second plug and display connectors also provide respective bidirectional audio signal communication paths;

a bi-directional plug and display connector link providing pin-to-pin connections between said first and second plug and display connectors thereby providing communication paths between said audio/video input of said computer said control electronics, said display electronics and said audio amplifier of said display; said display further including:

stored display parameter information accessible by said computer to permit exchange of signals in both directions between said computer and said display over said universal serial bus hub and said first and second plug and display connectors to enable configuration of said user control interface of said display and of said signal processor by said computer.

13. A system comprising:

a computer including an audio/video input coupled by a signal processor to a first multi-pin plug and display connector providing respective analog and digital video signal paths; and a display including display electronics coupled to control electronics, and a first universal bi-directional serial bus hub signal interface coupling said control electronics to a second multi-pin plug and display connector providing at least analog video signal paths or at least digital video signal paths; said display also including a user display control input interface coupled to said control electronics;

said computer including a second bi-directional universal serial hub connected to a plurality of universal serial bus ports and by a bi-directional universal serial bus interface to said first plug and display connector;

said display further includes audio/video electronics coupled to said display electronics, to said control electronics, and to at least a tuner in said display and an audio/video input/output of said display, and bi-directional signal communication paths between said audio/video electronics and respective audio/video input and output connectors;

said display also including an audio amplifier coupled to at least one speaker, said audio amplifier also coupled by a bidirectional USB connection to serial hub control electronics; and wherein said first and second plug and display connectors also provide respective bi-directional audio signal communication paths;

a bi-directional plug and display connector link providing pin-to-pin connections between said first and second plug and display connectors thereby providing communication paths between said audio/video input of said computer said control electronics, said display electronics and said audio amplifier of said display;

said display further including:

stored display parameter information accessible by said computer to permit exchange of signals in both directions between said computer and said display over said universal serial bus hub and said first and second plug and display connectors to enable configuration of said user control interface of said display and of said signal processor by said computer.

14. The system as set forth in claim 13, wherein the display is operable to generate a vertical sync line which is monitored to effect power management control of the display between different power mode states.

* * * * *